United States Patent [19]

Garrett et al.

[11] Patent Number: 5,015,269
[45] Date of Patent: May 14, 1991

[54] GAS SEPARATION

[75] Inventors: Michael E. Garrett; John B. Gardner, both of Woking, United Kingdom

[73] Assignee: The BOC Group plc, Windlesham, England

[21] Appl. No.: 454,790

[22] Filed: Dec. 21, 1989

[30] Foreign Application Priority Data

Dec. 23, 1988 [GB] United Kingdom ............... 8830107

[51] Int. Cl.$^5$ ............................................. B01D 53/22
[52] U.S. Cl. ........................................ 55/16; 55/68; 55/158
[58] Field of Search .......................... 55/16, 68, 158

[56] References Cited

U.S. PATENT DOCUMENTS

| | | | |
|---|---|---|---|
| 2,958,391 | 11/1960 | de Rosset | 55/16 |
| 3,062,905 | 11/1962 | Jennings et al. | 55/16 X |
| 3,135,591 | 6/1964 | Jones | 55/16 |
| 3,245,206 | 4/1966 | Bonnet | 55/158 |
| 3,307,330 | 3/1967 | Niedzielski et al. | 55/16 |
| 3,336,730 | 8/1967 | McBride et al. | 55/16 |
| 3,494,465 | 2/1970 | Nyrop | 55/158 X |
| 3,499,265 | 3/1970 | Langley et al. | 55/158 |
| 3,811,319 | 5/1974 | Arnold | 73/23 |
| 3,911,080 | 10/1975 | Mehl et al. | 55/16 X |
| 3,930,814 | 1/1976 | Gessner | 55/16 |
| 3,979,190 | 9/1976 | Hedman | 55/16 X |
| 4,208,902 | 6/1980 | Kim et al. | 55/158 X |
| 4,220,535 | 9/1980 | Leonard | 55/158 X |
| 4,349,356 | 9/1982 | Wakao | 55/16 |
| 4,427,424 | 1/1984 | Charpin et al. | 55/158 |
| 4,497,640 | 2/1985 | Fournié et al. | 55/16 |
| 4,508,548 | 4/1985 | Manatt | 55/16 X |
| 4,612,019 | 9/1986 | Langhorst | 55/16 |
| 4,676,808 | 6/1987 | Coplan | 55/16 X |
| 4,704,139 | 11/1987 | Yamamota | 55/3 |
| 4,789,388 | 12/1988 | Nashibata | 55/158 |
| 4,824,444 | 4/1989 | Nomura | 55/16 |
| 4,834,779 | 5/1989 | Paganessi et al. | 55/16 |

FOREIGN PATENT DOCUMENTS

| | | |
|---|---|---|
| 0166994 | 8/1986 | European Pat. Off. . |
| 0277411 | 8/1988 | European Pat. Off. . |
| 3712492 | 4/1987 | Fed. Rep. of Germany . |
| 63-240916 | 10/1988 | Japan ............... 55/158 |
| 8807398 | 10/1988 | PCT Int'l Appl. . |
| 1256153 | 12/1971 | United Kingdom . |

OTHER PUBLICATIONS

G. C. East, J. E. McIntrye, V. Rogers and S. C. Senn, "Production of Porous Hollow Polysulphone Fibres for Gas Separation", Royal Society of Chemistry (Special Publication No. 62), 1986, pp. 130–144.

Primary Examiner—Robert Spitzer
Attorney, Agent, or Firm—Robert I. Pearlman; Coleman R. Reap

[57] ABSTRACT

In a membrane apparatus for separating a gas mixture, permeate gas is withdrawn from the vessel housing the membranes along passages whose extent along the flow path of the nonpermeate gas is only a fraction of the extent of such flow path. Thus, the gas mixture to be separated may be passed along the insides of a multiplicity of hollow fibres 8 whose walls are of a suitable membrane and cells 18 for the withdrawal of the permeate gas are defined by partitions 16 extending transversely to the fibres 8. Alternatively, an open-pored foamed plastics may be used instead of the partitions 16, or the gas may pass outside the fibres which are arranged transversely to the general direction of gas flow through the vessel, the permeate gas being withdrawn along the inside of each hollow fibre.

15 Claims, 2 Drawing Sheets

GAS SEPARATION

FIELD OF THE INVENTION

This invention relates to gas separation by semi-permeable membranes.

BACKGROUND OF THE INVENTION

Although it was recognised in the nineteenth century that a selective gas separation can be performed as a result of different permeation velocities of the respective components, it was not until the 1960s that suitable membranes with adequately high permeability and separation efficiencies became available to allow such gas separation to be performed on a significant commercial scale. Since the 1960s the use of semi-permeable membranes to separate gas mixtures has become a well known technique in the production of industrial gases. Known plants for the separation of a gas mixture by membranes are constructed so as to present a large surface area of membrane to the gas mixture to be separated. For example, such plants may employ a multitude of identical, elongate, hollow fibres which are formed of a suitable semi-permeable membrane and which extend in parallel to one another. The fibres are appropriately mounted in a pressure vessel. The gas mixture to be separated is fed into the pressure vessel at or near one end outside the fibres. It flows longitudinally of the fibres. The insides of the fibres are maintained at a pressure lower than that which obtains on the outside of them. If the gas mixture to be separated consists of two components, the faster permeating component passes more and more to the low pressure side. Accordingly the gas on the outside of the fibres (the high pressure side) becomes richer in the slower permeating component as it flows along the outside of the fibres and a product gas, rich in the more slowly diffusing component, may be withdrawn at pressure from the end of the pressure vessel opposite that at which the feed gas is introduced.

The permeate gas is richer than the feed gas in the faster diffusing component. The permeate gas is withdrawn from the insides of the fibres at the same end of the pressure vessel as that at which the feed gas is introduced. Accordingly, the permeate gas flows generally countercurrently to the feed gas. At any point along a fibre the net rate of diffusion of each component across the membrane depends on the ratio of the partial pressures of that component on the respective sides of the membrane. As the feed gas passes along the membrane, the partial pressure of the more rapidly diffusing component of the mixture falls. We have found that for a given gas inlet and permeate outlet pressure and for a given permeability ratio and cell of given dimensions, there is a limit to the amount to which the more rapidly diffusing component can be reduced in the feed gas when using countercurrent flow.

It is an aim of the present invention to provide a gas separation method and apparatus which reduces or overcomes this difficulty.

SUMMARY OF THE INVENTION

According to the present invention there is provided a method of separating a gas mixture in a vessel housing a multiplicity of semi-permeable membranes including the steps of passing the gas mixture from an inlet to an outlet of the vessel along a flow path in contact with the membranes, whereby one component of the gas mixture diffuses more rapidly through the membrane than another or the other component of the gas mixture the gas mixture thus being enriched in said other component and withdrawing permeate gas in a plurality of streams along separate passages, wherein the extent of each passage longitudinally of said flow path is only a fraction of the extent of said flow path.

The invention also provides apparatus for separating a gas mixture comprising a vessel housing a multiplicity of semipermeable membranes and having an inlet for the feed gas mixture communicating with an outlet of the vessel along a flow path in contact with the membranes, whereby in operation one component of the gas mixture diffuses more rapidly through the membranes than another or the other component of the gas mixture, the qas mixture thus being enriched in said other component wherein separate passages are defined in the vessel for withdrawal of permeate gas in a plurality of streams, and wherein the extent of each passage longitudinally of said flow path is only a fraction of the extent of said flow path.

The membranes preferably each comprise a hollow fibre which can have a uniform or asymmetric cross-sectional structure.

In methods and apparatus according to the invention the fibres may all extend along the flow path or across the flow path.

With the fibres all extending along the flow path, the feed gas mixture to be separated is fed to the insides of the fibres. Separate passages for the permeate gas may be defined by longitudinally spaced partitions through which the fibres extend. Typically, there are at least ten such partitions. The partitions define cells which are each provided with an outlet positioned so as to create a general direction of gas flow therethrough counter-current to that through the fibres. Alternatively, the space within the vessel surrounding the fibres may contain a plastics foam whose pores are open. The exterior of the foam communicates with a duct whereby the permeate gas tends to flow at right angles to the fibres with relatively little longitudinal mixing.

We prefer, however that the fibres all be disposed transversely to the flow path since we believe that such an arrangement is easy to manufacture and can improve the yield of the product over that given by a longitudinal arrangement in accordance with the invention.

BRIEF DESCRIPTION OF THE DRAWINGS

The method and apparatus according to the invention will now be described by way of example with reference to the accompanying drawings, in which.

DESCRIPTION OF THE PREFERRED EMBODIMENTS

Figure 1:
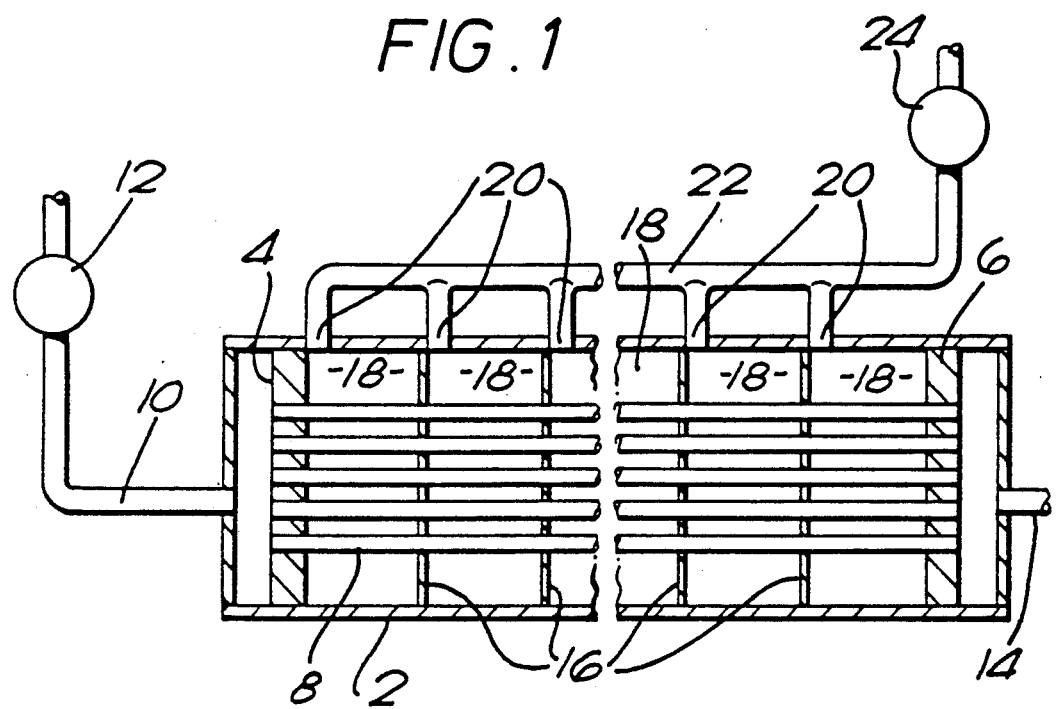
FIG. 1 is a schematic side elevation of a gas separation vessel according to the invention.

Referring to FIG. 1 of the drawings, a gas separation apparatus comprises a generally cylindrical pressure vessel 2 mounted with its main axis extending horizontally. The vessel 2 has end discs or plugs 4 and 6 spaced apart from one another. A multitude of generally identical hollow fibres 8 each formed as a gas separation membrane extend from the plug 4 to the plug 6. The plug 4 receives the left hand ends of the fibres (as shown) and is bonded to them in a fluid-tight manner such that there is no leakage of gas between the outside surface of each fibre 8 and the plug 4. There is also a fluidtight seal between the plug 4 and the inner surface of the vessel 2. The ends of the fibres 8 embedded in the plug 4 are open and communicate with an inlet 10 for a compressed feed gas mixture supplied from a compressor 12. The plug 6 receives the right hand ends of the fibres (as shown) and is bonded to them in a fluid-tight manner such that there is no leakage of gas between the outside surface of each fibre 8 and the plug 6. There is also a fluid-tight seal between the plug 6 and the inner surface of the vessel 2. The ends of the fibres 8 embedded in the plug 6 are open and communicate with an outlet 14 for a product gas.

The space surrounding the fibres is divided longitudinally into a plurality of separate cells 18 by means of a plurality of longitudinally spaced discs or partitions 16 through which the fibres 8 pass. The discs 16 are each bonded fluid-tight to the fibres 8 and each engage the inner surface of the pressure vessel 2. The discs 16 and the plugs 4 and 6 are typically made of epoxy resin. The mounting of the fibres in end plugs is well known in the art. Each cell 18 has one or two outlets 20 positioned as near as possible to the plug 4 so as to ensure that the gas flow in each cell 18 is countercurrent to that through the fibres 8. The outlets 20 may all communicate with a main 22 terminating in a pump 24 operable to withdraw gas from the cells 18.

The fibres 8 may be of a material having a symmetric crosssectional structure or an asymmetric one being more dense on the inside than the outside. In conventional gas separation apparatus employing hollow asymmetric fibres of a material that has the property of being of semi-permeable membrane, the fibre structure is denser on the outside. However, the asymmetry may be reversed such that the fibre cross-section is denser on the inside. For a description of the manufacture of semipermeable membrane fibre, see for example, 'Production of Porous Hollow Polysulphone Fibres for Gas Separation', G C East et al, Membranes in Gas Separation and Enrichment, Royal Society of Chemistry (Special Publication No 62) (1986) pp 130 to 144.

In operation, compressed gas mixture to be separated is fed continuously into the inlet 10 to the vessel 2 from the compressor 12. The compressed gas mixture enters left hand ends of the hollow fibres 8 and flows there along. Suppose the gas mixture comprises two components A and B. A diffuses through the walls of the fibres faster than B. Accordingly, as the gas mixture passes along the fibres it becomes richer in component B. The fibres may be of a chosen length such that the product gas leaving the right hand ends of the fibres (as shown) and passing through the outlet 14 of the vessel 2 is gas B of a desired purity. If desired, the product gas may be further purified by being admitted to a second apparatus identical to that shown in FIG. 1.

Considering again the flow of the compressed gas mixture through each membrane fibre 8, the permeable gas which is relatively rich in the faster diffusing component A passes into the cells 18, flows countercurrently to the gas in the fibres and is withdrawn by the pump 24 through the outlets 20. Accordingly, there is no mixing of gas from different cells 18 in the vicinity of the membrane fibres 8. The net rate of diffusion of component A through one of the fibres 8 from its high pressure to low pressure side (that is from its inside to its outside) at any point depends on the ratio of the partial pressures of component A on the respective sides of that point. As the compressed gas flows from the left hand end to the right hand end of each fibre the partial pressure of component A falls. There is therefore a tendency for the rate of diffusion of component A through the membrane to undergo a corresponding fall. However, this tendency is counteracted at least in part as the partial pressure of component A on the low pressure side of the fibre is reduced. It must nonetheless be borne in mind that in a conventional 'cell' which does not contain any of the partitions 16 there is a considerable pressure drop as the permeate gas flows countercurrently to the incoming gas flow. Accordingly, at the downstream end (with respect to product gas) of the cell the pressure of the permeate gas is at a maximum (while that of the product gas is at a minimum). This condition thus gives rise to difficulties in obtaining a product gas of optimum priority. However, in the apparatus shown in FIG. 1, the division of the permeate side of the vessel into a plurality of cells 18 reduces the adverse effect of such pressure drop. While it is possible to obtain some improvement using one such disc 16, typically located say half way along the path defined by the fibres 8, it is preferred to use at least 10 such partitions so as to form at least eleven cells 18. The extent of each cell passage longitudinally of the flow path of compressed gas through the membranes is thus less than 10% of the total length of this path.

Figure 3:
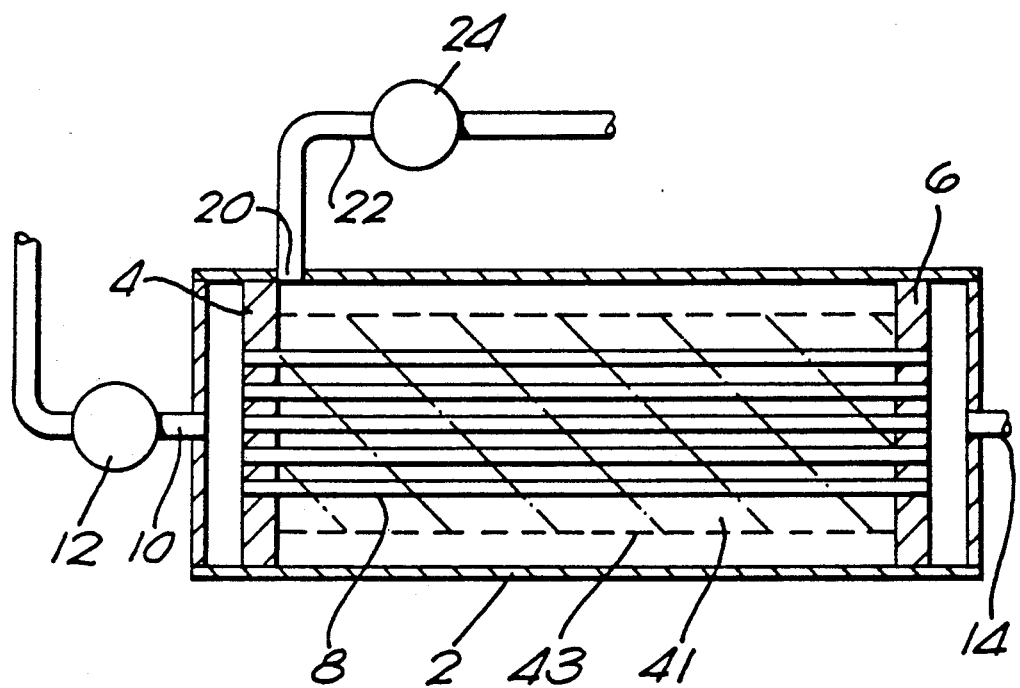
FIG. 3 is a schematic side elevation of a further gas separation vessel according to the invention.

The effect of the partitions can be obtained by using plastics foam instead. Thus the fibres may be packed in a foamed plastics material 1 having open pores, as shown in FIG. 3 in which parts corresponding to those shown in FIG. 1 are indicated by the same reference numerals as are used in FIG. 1. The foam is preferably maintained in an inner mesh or grid sleeve 43 which is radially spaced from the all of an outer container so as to define a duct from which permeate gas can be drawn. Since the radical path length can be made short as compared with the longitudinal one. the general direction of gas flow can be caused to be radial rather than longitudinal, thereby mitigating the effect of longitudinal pressure drop. There is a wide range of commercially available foamed plastics materials that can be used for this purpose.

Figure 2:
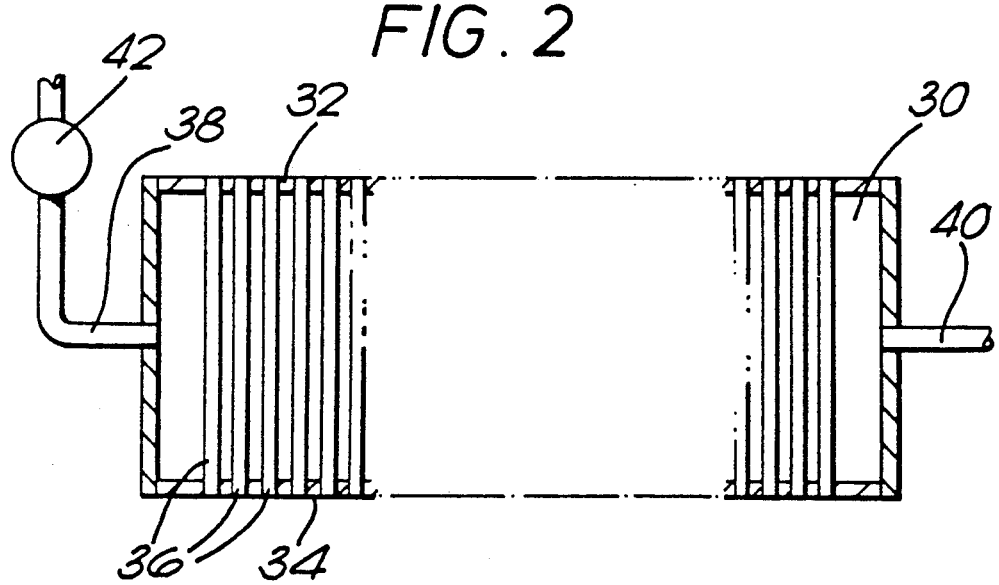
FIG. 2 is a schematic side elevation of another gas separation vessel according to the invention.

The apparatus shown in FIG. 2 employs hollow fibres that act as membranes disposed transversely to the flow path of the compressed gas mixture thereby enabling the insides of the fibres to define the passages through which the permeate gas streams are withdrawn. Referring to FIG. 2, a gas separation apparatus comprises a generally cuboidal vessel disposed with its main axis horizontal. Its horizontal walls 32 and 34 are formed of epoxy resin. A multitude of hollow generally identical fibres 36 each formed as a gas separation membrane extend downwards from the wall 32 to the wall 34. The wall 32 receives the upper ends (as shown) of the fibres 36 and is bonded to them in a fluid-tight manner such that there is no leakage of gas between the outside surface of each fibre 36 and the wall 32. The ends of the fibres 36 embedded in the wall 32 are open and communicate with the exterior of the vessel. The wall 34 receives the lower ends of the fibres (as shown) and is bonded to them in a fluid-tight manner such that there is no leakage of gas between the outside surface of each fibre 36 and the wall 34. The fibres are also open at their lower ends and thus communicate with the atmosphere outside the vessel 30.

The vessel 30 has at its respective ends an inlet 38 for the gas mixture and an outlet 40 for product gas. The inlet 38 communicates with the outlet of the compressor 42, the inlet of the compressor 42 being connected to a source (not shown) of the feed gas mixture.

In operation of the apparatus shown in FIG. 2, the feed gas mixture flows through the vessel outside the fibres with the undesired component(s) of the gas mixture permeating through the fibre walls, while permeate gas is conducted vertically out of the vessel along the fibres 36. The fibres 36 may be of a material having an asymmetrical cross-section which is more dense on the outside than the inside or a symmetrical one. There is preferably a high density of fibres 36 within the vessel 30 such that the non-permeate gas slowly progresses along the vessel continually meeting new fibres. Each time gas meets a new fibre, there is permeation of its components through the outer wall of the fibre into its hollow interior. The permeate gas is relatively rich in the more rapidly diffusing component of the gas mixture. The permeate gas flows through the respective fibre to the atmosphere outside the vessel. Accordingly, owing to the disposition of the fibres transversely to the product gas flow, the effect of pressure drop along the interiors of the tubular fibres is mitigated.

The rate of gas flow along individual fibres will diminish gas the purity of the non-permeate gas increases relative to the selectivity of the membrane from which the fibres are formed. However, the fibre pores and the permeability can be chosen such that the flow out of the individual fibres is sufficiently fast to prevent atmospheric gas entering from outside the vessel. Accordingly, the non-permeate gas becomes enriched in the slower diffusing component or components of the gas mixture as it passes along the vessel 30 and thus a product gas enriched in such components may be withdrawn from the outlet 40.

Various modifications may be made to the apparatus shown in FIG. 2. For example, the fibres may be open at one end only thereby increasing the velocity of the permeate gas out of the vessel 30. Alternatively, the fibres could each be looped with both ends embedded in a single wall of the vessel. It is also possible to locate the vessel 30 within an outer vessel (not shown) to enable the permeate gas to be collected. If desired, the permeate gas may be recycled to the compressor 42 to improve the overall yield of the process. Also, if desired, the outer vessel may be connected to a vacuum pump so as to apply a vacuum to the hollow interior of the fibres. A yet further alternative is to apply such a vacuum only to the fibres at the product outlet end of the vessel 30.

If the gas mixture comprises three or more components, then it is possible to employ in the vessel 30 membranes having different permeability properties from one another so as to facilitate the separation of a plurality of components in the permeate gas and thus enable a product consisting essentially of a single component to be withdrawn through the outlet 40 of the vessel 30. Moreover, in this and other embodiments of apparatus according to the invention, it is possible to use a plurality of vessels 30 in series with one or more others.

The apparatus shown in the drawings may be used to separate a wide range of different gas mixtures, the membranes being selected according to the gas mixture to be separated. The apparatus may for example be used to produce a nitrogen product from air.

Although the invention has been described with reference to the use of membranes in the form of hollow fibres, the principle of the invention may be employed in gas separation apparatus employing different structures of membrane, for example sheets of membrane. In general, however, the use of membranes in the form of fibres is preferred.

We claim:

1. A method of separating a gas mixture in a vessel housing a multiplicity of semi-permeable membranes, including the steps of passing the mixture from an inlet to an outlet of the vessel along a flow path longitudinally in contact with the membranes, whereby one component of the gas mixture diffuses more rapidly through the membranes than another or the other component of the gas mixture, the gas mixture thus being enriched in said other component, and withdrawing permeate gas in a plurality of streams along separate passages, wherein said passages are defined by means which limit the extent of flow of permeate gas in each passage longitudinally off the said flow path to a fraction of the extent of the said flow path.

2. A method as claimed in claim 1, in which the membranes each comprise of hollow fibre.

3. A method as claimed inn claim 2, in which the fibres all extend along the said flow path, the feed gas mixture to be separated being fed to the insides of the fibres.

4. A method as claimed in claim 3, in which the means defining said separate passages for the permeate gas are longitudinally spaced partitions through which fibres extend.

5. A method as claimed in claim 4, in which there are at least 10 partitions.

6. A method as claimed in claim 3, in which the fibres are contained within foamed plastics material having open cells defining radial passages whereby the general direction of permeate gas flow is radial rather than longitudinal.

7. A method according to any of claims 1 to 3, in which the means defining said passages is open-pored foamed plastics material whereby the general direction of permeable gas flow is radial rather than longitudinal.

8. A method of separating a gas mixture in a vessel housing a multiplicity of semi-permeable membranes comprising hollow fibres, including the steps of passing the mixture from an inlet to an outlet of the vessel along a flow path in contact with the membranes, whereby one component of the gas mixture diffuses more rapidly through the membranes than another or the other component of the gas mixture, the gas mixture thus being enriched inn said other component, wherein the fibers all extend across the flow path, the feed gas is passed through the vessel outside the fibers, permeate gas is withdrawn from within the fibbers and the fibres have a plurality of different compositions.

9. Apparatus for separating a gas mixture comprising a vessel housing a multiplicity of semi-permeable membranes and having an inlet for the gas mixture communicating with an outlet of the vessel along a flow path longitudinally in contact with the membranes whereby in operation one component of the gas mixture diffuses more rapidly through the membranes than another or the other component of the gas mixture, the gas mixture thus being enriched in the sad other component, wherein separate passages are defined in the vessel for withdrawal of permeate gas in a plurality of streams, said passages being defined by means which limit the extent of flow of permeate gas in each passage longitudinally of said flow path to only a fraction of the extent of said flow path.

10. Apparatus as claimed in claim 9, in which the membranes each comprise a hollow fibre.

11. Apparatus as claimed in claim 10, in which the fibres all extend along the flow path and the vessel has an inlet for the feed gas mixture which communicated with the insides of the fibres.

12. Apparatus as claimed in claim 11, in which separate passages for the permeate gas are defined by longitudinally spaced partitions through whhhich the fibres extend.

13. Apparatus as claimed in claim 12, in which there are at least 10 such partitions.

14. Apparatus as claimed in claim 11, in which the fibres are contained with foamed plastics material having open cells defining radial passages whereby the general direction of permeate gas flow is radial rather than longitudinal.

15. Apparatus for separating a gas mixture comprised of at least three components comprising a vessel housing a multiplicity of semi-permeable membranes comprising hollow fibres of different compositions, said vessel having an inlet for the gas mixture communicating with an outlet of the vessel along a flow path in contact with the outside of the fibres whereby in operation one component of the gas mixture diffuses more rapidly through certain fibres than the other components of the gas mixture and another component of the gas mixture diffuses more rapidly through other fibres than the other components of the gas mixture, the gas mixture thus being enriched in the nonpermanent component or components, and means for withdrawing the permeate gases from the vessel from within the fibres.

* * * * *